(12) United States Patent
Bleibler et al.

(10) Patent No.: US 9,680,408 B2
(45) Date of Patent: Jun. 13, 2017

(54) ROOF INSTALLATION SUPPORT FIXING DEVICE AND ROOF INSTALLATION SYSTEM

(71) Applicant: SIKA TECHNOLOGY AG, Baar (CH)

(72) Inventors: Alexander Bleibler, Winterthur (CH); Peter Hübscher, Obernau (CH); Heinz Meier, Zürich (CH); Hans Rohrer, Sachseln (CH)

(73) Assignee: SIKA TECHNOLOGY AG, Baar (CH)

( * ) Notice: Subject to any disclaimer, the term of this patent is extended or adjusted under 35 U.S.C. 154(b) by 0 days.

(21) Appl. No.: 14/439,491

(22) PCT Filed: Nov. 4, 2013

(86) PCT No.: PCT/EP2013/072959
§ 371 (c)(1),
(2) Date: Apr. 29, 2015

(87) PCT Pub. No.: WO2014/068120
PCT Pub. Date: May 8, 2014

(65) Prior Publication Data
US 2015/0318816 A1    Nov. 5, 2015

(30) Foreign Application Priority Data

Nov. 5, 2012 (EP) .................................... 12191266

(51) Int. Cl.
*H02S 20/23* (2014.01)
*H02S 20/22* (2014.01)
(Continued)

(52) U.S. Cl.
CPC ............... *H02S 20/22* (2014.12); *E04B 1/40* (2013.01); *F24J 2/523* (2013.01); *F24J 2/525* (2013.01);
(Continued)

(58) Field of Classification Search
CPC  H02S 20/22; H02S 20/23; H02S 20/24; F24J 2/5252; F24J 2/5256
See application file for complete search history.

(56) References Cited

U.S. PATENT DOCUMENTS

2008/0310913 A1* 12/2008 Urban ................... F16B 7/0493
                                                              403/404
2010/0089390 A1*  4/2010 Miros ..................... F24J 2/5239
                                                              126/608

(Continued)

FOREIGN PATENT DOCUMENTS

DE    202006007066 U1    8/2006
DE    202010005531    *  9/2010
(Continued)

OTHER PUBLICATIONS

May 5, 2015 International Report on Patentability issued in International Patent Application No. PCT/EP2013/072959.
(Continued)

*Primary Examiner* — Adriana Figueroa
(74) *Attorney, Agent, or Firm* — Oliff PLC

(57) ABSTRACT

A fastener for a roof installation support, in particular for a support of a solar technology system, comprising an at least sectionally flexible baseplate section and a substantially stiff profile section rising up from the baseplate section, which profile section is constructed to surround and positively fix a profile section of the roof installation support.

19 Claims, 2 Drawing Sheets

(51) Int. Cl.
  *E04B 1/41* (2006.01)
  *F24J 2/52* (2006.01)
  *E04B 1/38* (2006.01)
(52) U.S. Cl.
  CPC ......... *E04B 2001/405* (2013.01); *Y02B 10/10* (2013.01); *Y02B 10/20* (2013.01); *Y02E 10/47* (2013.01)

(56) References Cited

U.S. PATENT DOCUMENTS

| | | | |
|---|---|---|---|
| 2010/0269447 A1 | 10/2010 | Schuit et al. | |
| 2011/0174353 A1* | 7/2011 | Urban | F24J 2/5232 136/244 |
| 2013/0133275 A1 | 5/2013 | Bindschedler et al. | |

FOREIGN PATENT DOCUMENTS

| | | | | |
|---|---|---|---|---|
| DE | 202010005531 U1 | 9/2010 | | |
| DE | 102009056318 A1 * | 6/2011 | | F24J 2/523 |
| DE | WO 2011071489 A1 * | 6/2011 | | |
| DE | 102014007971 A1 * | 12/2015 | | F24J 2/5203 |
| EP | 2418438 A2 | 2/2012 | | |
| WO | WO 2011031248 A2 * | 3/2011 | | F24J 2/4607 |
| WO | 2011/071489 A1 | 6/2011 | | |
| WO | 2012/004542 A2 | 1/2012 | | |

OTHER PUBLICATIONS

Dec. 2, 2013 International Search Report issued in International Patent Application No. PCT/EP2013/072959.
May 2, 2016 Written Opinion in Singaporean Patent Application No. 11201503087P.
Sep. 2, 2016 Office Action issued in Chinese Patent Application No. 201380057496.X.

* cited by examiner

ROOF INSTALLATION SUPPORT FIXING DEVICE AND ROOF INSTALLATION SYSTEM

TECHNICAL FIELD

The invention relates to a fastener for a roof installation support, in particular a support for a solar technology plant. It further relates to a roof installation system, in particular for a solar technology system.

PRIOR ART

Solar technology systems, including photovoltaic systems and solar collectors are installed on house roofs using special roof installation systems which are designed to avoid as much as possible penetrating the roof covering by auxiliary installation means.

It is important, especially in the case of flat roofs whose seal is produced by plastic sealing webs (KDB), to avoid a penetration of the roof seal by the support or fastening means of the roof installation system. EP 2 418 438 A2 discloses a support for a roof installation system for photovoltaic systems, which support can be connected by means of flexible fastening strips to a plastic sealing web without penetration thereof, by welding or adhesive fastening.

A fastener for a roof installation support is known from WO 2012/004542 A2 and comprises a base plate in which pins are introduced, which penetrate the base plate. On the whole, the structure according to WO 2012/004542 A2 is comparatively complex, which is associated with a correspondingly expensive manufacture. A one-piece holder is known from DE 20 2010 005 531 U1, in which a base plate is constructed designed as integral with angular webs. Screw holes which cooperate with corresponding screws are provided for the actual fastening. The angular webs therefore serve merely as a guide, with the actual fastening being accomplished by a screw connection. As a result, this solution is also comparatively complex and is associated with high production and installation cost.

DESCRIPTION OF THE INVENTION

The object of the invention is to indicate an improved fastener for a roof installation support and a correspondingly improved roof installation system that offer increased strength and reliability and can be economically produced and installed.

This object is attained by a fastener having the features of Claim 1 and by a roof installation system having the features of Claim 11. Advantageous further developments of the concept of the invention are the subject matter of the respective dependent claims.

One concept of the invention consists in constructing the fastener with two sections that are defined differently in terms of function and as regards significant mechanical properties: On the one hand, a baseplate section is provided for attachment to the base, which baseplate section has a sufficiently large surface and a certain flexibility for adapting to a (slightly) uneven base. On the other hand, a (rather) stiff section is provided for securely fixing the profile section of the support that will be fastened. Furthermore, the invention also comprises the concept of constructing this latter section as a profile section which is geometrically constructed for surrounding and positively fixing a profile section of the roof installation support without additional fastening means such as screws or the like. In particular, the fastener has precisely one such surrounding profile section. "Profile section" denotes a longitudinally extended section of a structural component with a given cross section (e.g. with or comprising a C, U, T, L, I cross section). In particular, the material thickness of such profile sections is constant.

In one embodiment of the invention the baseplate section has a strip-like first partial section from which the profile section rises up, and a second partial section extending from the first partial section to a longitudinal side as a widened area, said second partial section being more flexible than the first partial section. In another embodiment the baseplate section has a third and a fourth partial section extending from the ends of the first partial section to the side opposite the second partial section. Both embodiments serve to make a sufficiently large base surface of the fastener available in an advantageous manner that will ensure, in particular, a support on the base on both sides of the profile support section fixed to the fastener.

In another embodiment the profile section is U-shaped and the "U" is open toward the base plate section in such a way that the profile section of the roof installation support, which section is surrounded in the installed state, is enclosed between the base plate section and the profile section of the fastener. In this case, the "U" has a free first shank which is spaced by a sufficiently wide slot from the base plate section that the profile section of the roof installation support can be introduced laterally into the profile section of the fastener through the slot by tilting it about an axis parallel to its longitudinal extension.

It is provided in one embodiment that the second shank of the "U" is connected stiffly, in particular integrally to the base plate section. Furthermore, it is provided in terms of design that stiffening ribs running transversely to the longitudinal extent of the first partial section of the base plate section are formed in the throat between the profile section and the base plate section where the second shank of the "U" is connected to the base plate section. On the whole, a configuration of the fastener that is preferably constructed in such a manner ensures sufficient stiffness and a stable position of the fastened support on the base, while at the same time ensuring sufficient ease of installation and a durable fastening on the base.

In a manufacturing embodiment, the fastener is manufactured as integral, in particular as in injection-molded part. In this case a unified material construction can be provided, but as an alternative a construction consisting of a first material component for the flexible base plate section and a second material component for the (substantially) stiff profile section can be provided.

For the most important areas of use currently envisioned, at least the base plate section is manufactured from heat weldable material, in particular PVC or TPO, or adhesive material. This takes into account the fact that plastic sealing webs on which the fastener is to be used typically consist of PVC or TPO (also referred to as FPO), although so-called liquid films are also considered as possible bases.

One length of the profile section is preferably (on average) at least 3 times, preferably at least 5 times as large as a maximal extension in one direction perpendicular to the longitudinal direction of the profile section. As a result, the fastener can create an especially reliable fastening. Alternatively or additionally, the profile section can have a constant material thickness. As a result, the profile section can be produced in an especially simple manner and can nevertheless ensure a secure connection.

A material thickness of the profile section is (on average) preferably greater (at least 1.2 times or at least 1.5 times greater) than a material thickness of the baseplate section. Alternatively or additionally, an E modulus of the profile section can (on average) be greater than an E modulus of a material of the baseplate section (at least 1.2 times or at least 1.5 times or at least twice as great). As a result of these measures, an increased stiffness of the profile section relative to the baseplate section can be achieved in a simple manner.

In a preferred embodiment, a (average) height of the profile section is greater than a (average) width of the profile section (preferably at least 1.5 times greater, further preferably at least 2 times greater and even more preferably at least 3 times greater). The direction of the height is perpendicular to the surface of the baseplate section. The direction of the width is perpendicular to the direction of the height and the longitudinal direction provided by the extension of the profile section. As a result, a longitudinal edge of a roof installation support can be accommodated especially securely in the profile section, wherein the different degrees of stiffness can be utilized synergistically by the base body section and the profile section. On the whole, a reliable fastening can be achieved with simple measures. If the profile section is a U profile section (as described further above), the second shank of the "U" opposite the first shank can be larger than a connecting section between the two shanks, in particular at least 1.5 times, preferably at least 2 times, and even more preferably at least 3 times as large. In the case (as described above) of a U-shaped design of the profile section, the height of the profile section is defined by the second shank opposite the first shank. A width is defined by the connecting section between the two shanks.

In an embodiment of the proposed roof installation system, the one or the plurality of roof installation supports have a longitudinally extended base body with two longitudinal sides and two end face sides and the fasteners are constructed for attaching at least one longitudinal side of the roof installation system. For commercially available supports which have two profiles on their bottom side for support on the base, two or more, especially four fasteners are provided, in conformity with the system.

In a preferred embodiment of the roof installation system, said system comprises at least one first and one second (separate from the first) fastener, wherein the first fastener is provided for attaching a first longitudinal edge of the roof installation support and the second fastener is provided for attaching a second longitudinal edge of the roof installation support. In addition, (at least) two first fasteners and (at least) two second fasteners are preferably provided. Therefore, according to a general concept of the present invention, a plurality of (separate) fasteners that are associated with a (respective) roof installation support are provided within a roof installation system. As a result, in combination with the flexible base plate section and the comparatively stiff profile section, even given uneven bases, a reliable fastening of the roof installation support can be synergistically achieved.

At least one first and one second fastener are preferably provided, wherein the fasteners have a "U-shaped profile section, with the openings of the "U" of the first and of the second fastener facing one another. Such a construction facilitates the fastening of the roof installation support. In particular, use is made of the fact that the separate fasteners can be moved and/or tilted relative to one another (before fastening), so that the longitudinal edges of the roof installation support can be introduced into the profile sections (by tilting). This would not be possible, for example, with fastening sections constructed as fixed relative to one another.

BRIEF DESCRIPTION OF THE DRAWINGS

Advantages and uses of the invention also result from the following description of exemplary embodiments and aspects, in part in reference to the figures. In the figures.

WAY OF CARRYING OUT THE INVENTION

Figure 1:
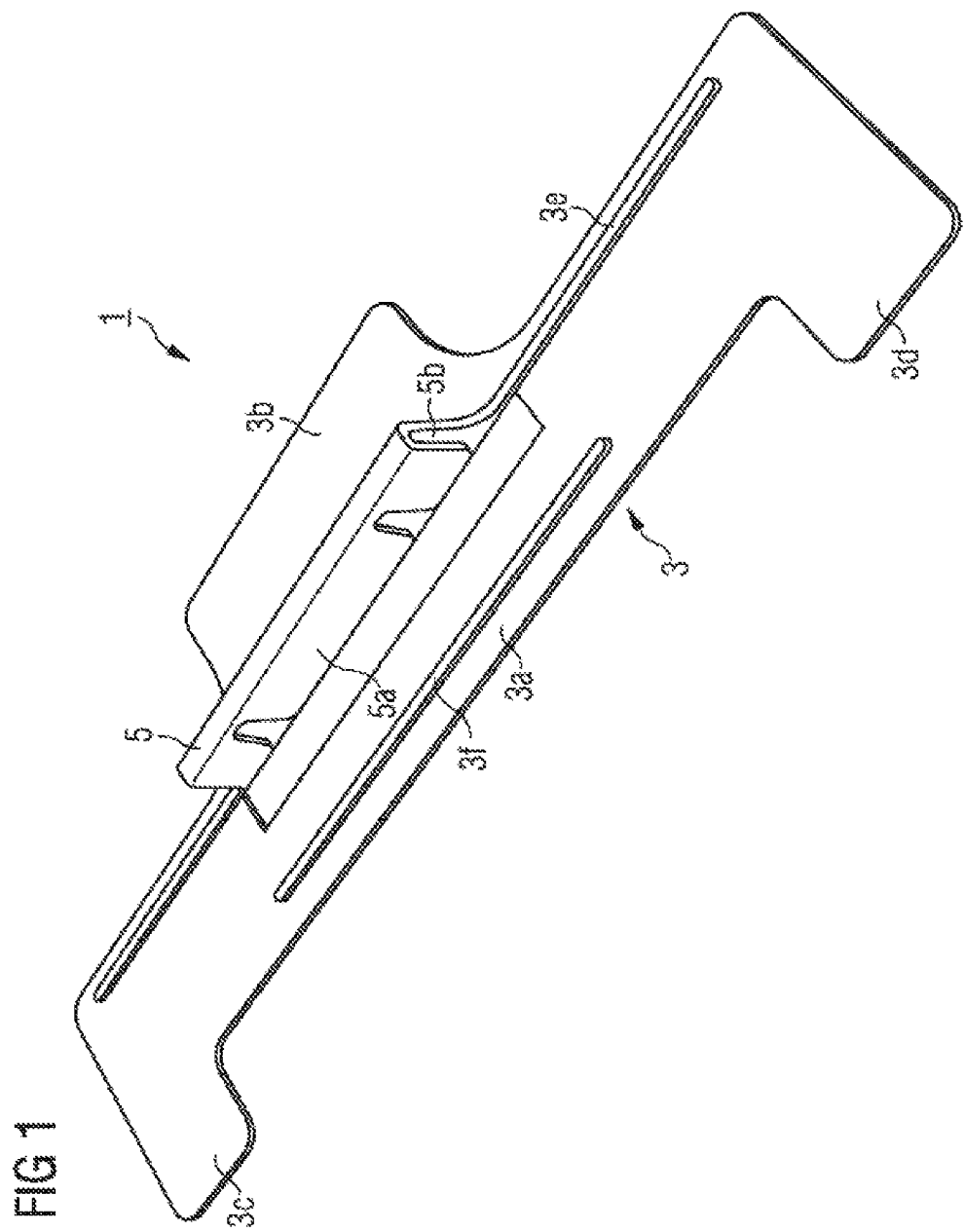
FIG. 1 shows a perspective view of a fastener according to an embodiment of the invention.

FIG. 1 shows a perspective view of a fastener 1 of a roof carrier for a photovoltaic system, which fastener is manufactured as an integral injection molded part and comprises a substantially level base plate section 3 which has a certain flexibility and a stiff profile section 5 projecting upward from it. The baseplate section has a strip-like first partial section 3a from the central area of which the profile section 5 rises up, and has a second partial section 3b extending therefrom to a longitudinal side as widened section. Two other widening partial sections 3c, 3d extend from the ends of the first partial section 3a to the opposite side. Two stiffening ribs 3e, 3f are formed in the strip-like first partial section 3a in the vicinity of its two longitudinal edges and running parallel to the latter.

The profile section 5 projects upward from the first stiffening rib 3e and has a narrow "U" shape in its cross section. The "U" is open on one side toward the baseplate section 3, that a profile section of a roof installation support is adapted to the shape of the fasteners in its geometrical shape, is pushed in and enclosed between the baseplate section and the profile section 3 and can be jointly fixed by the latter. Accordingly, the U-shaped profile 5 has a free first shank 5a and a second shank 5b connected to the baseplate section. Stiffening ribs 5c on the second shank 5b of the profile section 5 that additionally support the latter vis-à-vis the baseplate section 3 and stiffen the connection between both are not shown in FIG. 2 but can be recognized in FIG. 2 (see below in this regard).

Figure 2:
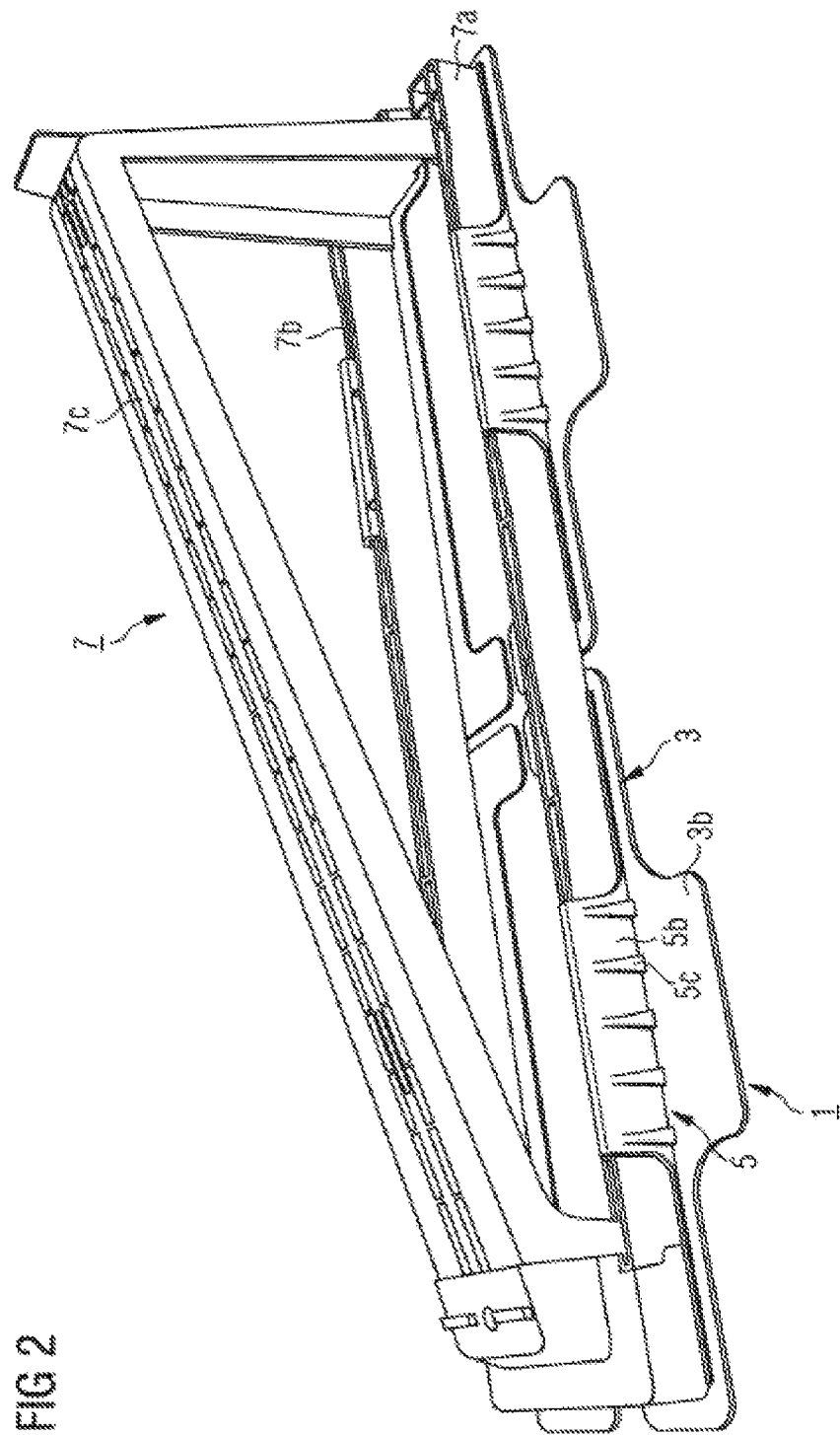
FIG. 2 shows a perspective view of the roof support of a roof installation system provided with a plurality of fasteners according to FIG. 1.

FIG. 2 shows four fasteners of the type shown in FIG. 1 and described further above, attached to a support 7 of a roof installation system. Support 7 comprises a bottom part consisting of two profile parts 7a, 7b and an upper part 7c opposite the bottom part and inclined at an angle relative thereto, on which upper part photovoltaic modules are held when the support is being used. The precise construction of the support is not important in with the context of the invention, however it should be pointed out that the profile section 5 of the fastener 1 is adapted to the profile parts 7a, 7b of the support 7 such that it engages into the latter in the manner shown in FIG. 2 and surrounds a section of the support profile part and exclusively holds it positively (without additional fastening elements) on the baseplate section 3 of the fastener. Since the former is, for its part, welded or (in the case of liquid film) adhesively fastened to the underlying plastic web, the fasteners hold the support reliably on the roof covering.

Furthermore, it is clear that the widened-out areas 3c, 3d not only serve to enlarge the support surface of the fastener on the roof surface but also form a base for the end sections of the support profiles 7a, 7b and help prevent possible damage to the roof covering by said end sections. Radii in all corners of the base plate section of the fastener serve the same purpose.

The implementation of the invention is not limited to the examples and aspects explained above, but rather is possible in a plurality of modifications that are part of the knowledge of a person skilled in the art.

LIST OF REFERENCE NUMERALS

1. Fastener
3. Base plate section
3a, 3b, 3c, 3d Partial section of the base plate section
3e, 3f Stiffening rib
5 Profile section of the fastener
5a, 5b Shanks of the profile section
5c Stiffening ribs
7. Roof installation support
7a, 7b Profile section of the roof installation support
7c Upper part

The invention claimed is:

1. A fastener for a roof installation support, the fastener comprising:
 a baseplate section; and
 a U-shaped profile section projecting upward from the baseplate section, the "U" being open toward the baseplate section and configured to surround and positively fix a profile section of the roof installation support without additional fastening means,
 wherein an E-modulus of a material of the profile section is greater than an E-modulus of a material of the baseplate section.

2. The fastener according to claim 1, wherein the baseplate section has a strip-shaped first partial section from which the profile section rises up and a second partial section, which extends from the first partial section up to a longitudinal side as a widened area and is more flexible than the first partial section.

3. The fastener according to claim 1, which is constructed as integral and/or is manufactured of unified material.

4. The fastener according to claim 3, which is manufactured from a first material component for the baseplate section and a second material component for the profile section.

5. The fastener according to claim 1, wherein at least the baseplate section is manufactured from heat weldable material.

6. The fastener according to claim 1, wherein corner areas of the baseplate section are rounded off by radii.

7. The fastener according to claim 1, wherein one length of the profile section is at least three times as large as a maximal extent of the profile section in a direction perpendicular to the longitudinal direction and/or wherein the profile section has a constant material thickness.

8. The fastener according to claim 1, wherein a material thickness of the profile section is greater than a material thickness of the baseplate section.

9. The fastener according to claim 3, wherein a height of the profile section is greater than a width of the profile section.

10. A roof installation system having at least one roof installation support and fasteners according to claim 1.

11. The roof installation system according to claim 10, wherein the roof installation support has a longitudinally extended base body with two longitudinal sides and two end face sides, and the fasteners are configured to attach at least one longitudinal side of the roof installation system.

12. The roof installation system according to claim 10, comprising two or more fasteners per roof installation support.

13. The roof installation system according to claim 12, comprising at least one first of said fasteners and one second of said fasteners, separate from the first fastener, wherein the first fastener is provided for attaching a first longitudinal edge of the roof installation support and the second fastener is provided for attaching a second longitudinal edge of the roof installation support.

14. A roof installation system having at least one roof installation support and fasteners according to claim 1, wherein the openings of the "U" face one another.

15. The fastener according to claim 1, wherein the profile section projects upward from a rib formed in the baseplate section.

16. The fastener according to claim 1, wherein the E-modulus of the material of the profile section is at least 1.2 times greater than the E-modulus of the material of the baseplate section.

17. The fastener according to claim 1, wherein the E-modulus of the material of the profile section is at least 1.5 times greater than the E-modulus of the material of the baseplate section.

18. The fastener according to claim 1, wherein the E-modulus of the material of the profile section is at least two times greater than the E-modulus of the material of the baseplate section.

19. The fastener according to claim 1, wherein the material of the baseplate section is manufactured from PVC, TPO, or an adhesive material.

* * * * *